United States Patent [19]

Braun et al.

[11] Patent Number: 5,277,459
[45] Date of Patent: Jan. 11, 1994

[54] PIPE CONNECTOR, PIPE COUPLER AND ASSOCIATED NUT

[75] Inventors: Franz-Josef Braun, Königsberg/Bayern; Jürgen Frey, Teunz, both of Fed. Rep. of Germany

[73] Assignee: Frankische Rohrwerke Gebr, Kirchner GmbH & Co., Konigsberg/Bayern, Fed. Rep. of Germany

[21] Appl. No.: 655,496

[22] Filed: Feb. 14, 1991

[30] Foreign Application Priority Data

Feb. 14, 1990 [DE] Fed. Rep. of Germany ....... 4004564

[51] Int. Cl.$^5$ .......................... F16L 21/06; F16L 3/00
[52] U.S. Cl. .................................. 285/419; 285/903; 285/921; 411/432; 174/92
[58] Field of Search ................. 285/419, 903, 921; 411/432; 174/92

[56] References Cited

U.S. PATENT DOCUMENTS

| | | |
|---|---|---|
| 2,664,023 | 12/1953 | Mugford ............................. 411/433 |
| 3,041,088 | 6/1962 | Brandon, Jr. ......................... 285/33 |
| 3,711,632 | 1/1973 | Ghirardi . |
| 4,248,459 | 2/1981 | Pate et al. ........................... 285/903 |
| 4,274,323 | 6/1981 | Resnicow ............................ 411/433 |
| 4,443,031 | 4/1984 | Borsh et al. ........................ 285/903 |
| 4,616,105 | 10/1986 | Borsh ................................ 285/419 |
| 4,795,197 | 1/1989 | Kaminski et al. ................... 285/903 |
| 4,801,158 | 1/1989 | Gomi ................................. 285/903 |
| 4,829,145 | 5/1989 | Mitchell et al. . |
| 4,888,453 | 12/1989 | Blasko . |
| 5,015,013 | 5/1991 | Nadin ................................. 285/903 |

FOREIGN PATENT DOCUMENTS

| | | |
|---|---|---|
| 0268869 | 6/1988 | European Pat. Off. . |
| 2553255 | 10/1977 | Fed. Rep. of Germany ...... 411/433 |
| 8805492 | 7/1988 | Fed. Rep. of Germany . |
| 3739745 | 11/1988 | Fed. Rep. of Germany . |
| 3814001 | 11/1988 | Fed. Rep. of Germany . |
| 3721354 | 1/1989 | Fed. Rep. of Germany . |
| 907211 | 6/1943 | France ............................... 411/433 |
| 1536344 | 8/1968 | France ............................... 411/433 |
| 7507218 | 12/1976 | Netherlands ....................... 285/903 |

Primary Examiner—Eric K. Nicholson

[57] ABSTRACT

A tube or pipe connector of plastic for corrugated pipes or tubes is adapted to be folded open in the axial direction, comprises two half members connected via a film hinge and provided with a detent member for mutual locking of the half members, and at least one portion which is adapted to receive corrugated pipe and the interior of which is formed to match the outer periphery of the corrugated pipe. The pipe connector is provided with a tube piece which has a thread and a stop member is provided which has an outer diameter greater than the outer diameter of the tube piece. Furthermore, a tube connector of plastic is proposed for corrugated pipes of different outer diameter, and a divisible nut of plastic for such tube connectors serves for securing the threaded tube pieces.

23 Claims, 4 Drawing Sheets

PIPE CONNECTOR, PIPE COUPLER AND ASSOCIATED NUT

BACKGROUND OF THE INVENTION

1. Field of the Invention

The invention relates to a pipe connector or pipe coupler of plastic for corrugated pipes which is adapted to be folded open in the axial direction, comprises two half members connected via a film hinge which are provided with detent means for mutual locking of the half members, and comprises at least one portion which is adapted to receive a corrugated pipe and the interior of which is formed corresponding to the outer periphery of the corrugated pipe.

2. Description of the Prior Art

Such a pipe connector is for example known from U.S. Pat. No. 3,711,632.

The known pipe connector is configured as corrugated pipe connector and so constructed that the portion adapted to receive the corrugated pipe is snapped onto the latter whilst a further portion of the known pipe connector extends beyond the end of the corrugated pipe. The corrugated pipe is provided with a lateral slit which extends over the entire longitudinal extent of the pipe and which can be bent open to receive one or more electrical cables in the corrugated pipe. Such corrugated tubes or pipes are particularly useful for laying cable bundles and cable harnesses, in particular in the automobile industry, but also in other technical apparatuses in which electrical lines, hydraulic lines, pneumatic lines and the like are laid. The corrugated pipe protects these lines and makes it possible to receive both cable and conduit harnesses in preassembled state, branch possibilities being creatable at any time through the lateral slit, and also permits the subsequent laying of additional lines which are pushed through the lateral slit into the corrugated pipe.

However, the lines within the longitudinally slit corrugated pipe are arranged fundamentally freely movably and consequently the known pipe connector comprises at its free end projecting beyond the end of the corrugated pipe inwardly projecting members which in the lock state of the pipe connector hold the lines running along the inside of the corrugated pipe. A disadvantage with such corrugated pipes is that the lateral slit of the corrugated pipe usually consisting of plastic is relatively sharp-edged and therefore there is a danger of injury when opening to introduce cables. The sharp-edged lateral slit can open, in particular when the corrugated pipe is laid curved, and as a result there is a risk of a cable at least partially emerging from the corrugated pipe and fraying through at the edges of the lateral slit. In addition, the open slit of the corrugated pipe leads to condensation water, other liquids, dust and dirt being able to penetrate into the interior of the corrugated pipe and leading there to corrosion of the lines and conduits; it should be remembered here that a pipe connector surrounding the corrugated pipe is present only in the end portion of said pipe.

Furthermore, for such a corrugated pipe provided with a longitudinal slit in U.S. Pat. No. 3,711,633 a pipe connector in T-arrangement (T-piece) is proposed to enable a further corrugated pipe to branch laterally from a continuous corrugated pipe. Furthermore, in this publication a pipe connector is proposed which is attached anywhere in the course of a continuous corrugated pipe and comprises in the centre an opening so that for example an individual line or conduit can be led laterally out of the continuous pipe.

The applicants of the present application have already proposed in DE-PS 3,640,226 an improved plastic protective pipe arrangement which consists of an inner longitudinally slit plastic pipe for receiving the lines and conduits and an outer longitudinally slit plastic pipe which is configured to engage round the inner plastic pipe from the outside and cover the longitudinal slit thereof towards the outside. For this purpose, the two plastic pipes are formed as annularly corrugated pipes, the longitudinal slit in the inner plastic pipe is smaller than half the diameter thereof and the longitudinal slit in the outer plastic pipe is so dimensioned that the outer plastic pipe can be clamped from the outside onto the inner plastic pipe.

This gives a substantially better protection for lines laid in the interior of this protective pipe arrangement because an outwardly open slit is no longer present. Furthermore, in the latter publication a branch piece is proposed having a continuous corrugated longitudinally divided tube piece which matches the inner pipe and/or the outer pipe and is adapted to be fitted thereon, and a longitudinally divided branch piece, the two halves of which are formed on a respective portion of the tube piece, the two half shells thus formed being adapted to be placed round the inner and/or outer pipe and/or secured to each other.

In another technical field as is described in DE-GM 7,315,704 a threaded plug of plastic which is provided with a hollow cylindrical body with an inner thread made up of two hollow cylindrical halves. The hollow cylindrical halves are joined at an end face in a bisection plane by one or more thin webs. These steps are intended to reduce the production expenditure hitherto necessary on injection moulding plastic threaded plugs with inner thread because the removal of the core of an injection mould is possible only by turning out of the threaded plug.

In the field of metal screws, DE-OS 2,037,251 has proposed a screw having a thin-walled hollow cylindrical shank which is provided with a thread. The shank consists of two sheet metal parts joined together. For the production a sheet metal strip is punched out and by a pressing die semicylindrical parts with threads are formed at the ends of the sheet metal strip. The intermediate member between the semicylindrical parts is bent over a mandrel so that the semicylindrical parts come to bear on each other. Such steps cannot of course be carried out with plastic parts.

The laying of cables and/or lines and conduits in corrugated pipes, in particular when using a protective pipe arrangement as is described in DE-PS 3,640,226, has numerous advantages. However, it was not so far recognized that at the ends of such pipe members problems can occur where the cables or lines must usually be led through holes into the devices or systems to be supplied. Such holes are present at the splashboards in motor vehicles, in the outer housing of devices to be supplied, on switching cabinets and the like. Now, the great advantage of the aforementioned corrugated pipes resides precisely in that they can also be pushed over already laid lines, conduits, cable strands and the like. This advantage is now lost wherever a usual bushing or grommet is used at a hole for example in a splashboard.

SUMMARY OF THE INVENTION

The invention is thus based on the problem of providing a pipe or tube connector which permits the full utilization of the advantages achievable with slit corrugated pipes.

The invention is based on the recognition of further developing the known pipe connector so that it can be snapped or locked onto a corrugated pipe, a tube piece with a thread being provided which can be pushed through a given hole. A further recognition of the present invention resides in providing a divisible nut which is known per se from another context and which can be pushed onto the tube piece according to the invention with positioned lines, cables, and a corrugated pipe surrounding them, and in the configuration of the nut particularly adapted to these purposes. Moreover, the knowledge on which the invention is based leads to provision of a pipe connector which still further increases the flexibility of a system according to the invention comprising corrugated pipes, pipe connectors and possibly nuts.

The invention therefore proposes in a tube connector of plastic for corrugated pipes which is adapted to be folded open in the axial direction, comprises two half members connected via a film hinge which are provided with detent means for mutual locking of the half members, and comprises at least one portion which is adapted to receive a corrugated pipe and the interior of which is formed corresponding to the outer periphery of the corrugated pipe, the improvement in which the pipe connector comprises a tube piece, the tube piece is provided with a thread and a stop member is provided of which the outer diameter is greater than the outer diameter of the tube piece.

After the two half members of the pipe connector connected via a film hinge have been locked together, i.e. a cable, a conduit or the like has been accommodated in the interior of the pipe connector, the threaded tube piece of said pipe connector is pushed into a hole provided until the stop member, the outer diameter of which is greater than the outer diameter of the tube piece, encounters the wall surrounding the hole. On the other side of the wall a nut adapted to the thread of the tube member can then simply be employed to secure the tube piece to the wall. The entire pipe connector is held in this manner securely at the intended point and the cables, lines or conduits arranged in the interior of the pipe connector are reliably held and completely protected from outer influences.

Advantageously, the tube connector is made in one piece thereby both making the manufacture more economical and facilitating the handling because no individual parts can be lost.

To facilitate the securing of the pipe connector, for instance by a nut screwed onto the tube piece, the pipe connector is preferably provided at its outer periphery at least partially with a non-smooth surface, for example a fluting. This makes it easier to hold the pipe connector by hand when tightening the nut. The fluting or grooving may also be configured so that it can be engaged by a correspondingly formed tool when higher operating forces become necessary. For this purpose, in advantageous manner the pipe connector is formed at its outer periphery for engagement by a tool, for example for placing an open-jawed wrench or spanner is made hexagonal. The surface of the pipe connector portion concerned may of course also be adapted to receive other tools, for example provided with an arcuate surface and a recess for receiving a sickle spanner. The grooving or the like or the outer contour configured for placement of a tool may in principle be provided at any desired point of the pipe connector. However, advantageously this region is in the area of the stop member which in any case has a relatively large diameter and is therefore particularly suitable for introduction of corresponding forces.

Preferably, the tube piece is provided with an outer thread. A conventional nut or more particularly preferred a divisible nut as will be described in further detail below may be pushed onto the outer thread. In addition, on an externally threaded tube piece a correspondingly formed internally threaded tube piece may be screwed, the latter belonging to a second pipe connector which leads over correspondingly to a further corrugated pipe.

It is however equally possible to provide the tube piece with an inner thread onto which a correspondingly outer threaded pipe connector is screwed, for instance a reducing piece, an expansion piece and the like, which are in turn each provided with a portion for receiving a corrugated pipe.

An arrangement which is particularly simple as regards production technique as well is obtained if the portion for receiving the corrugated pipe, the stop member and the tube piece are arranged in series in the axial direction of the pipe connector. In a preferred embodiment of the invention two portions are provided for receiving a respective corrugated pipe end (or for receiving a continuous corrugated pipe). With such a configuration, branch pieces may be implemented which are preferably made T-shaped, the two portions for receiving the corrugated pipes therefore aligning with each other and the longitudinal axis of the tube piece extending transversely of said direction, or for example a Y-shaped branch piece, the two portions for receiving corrugated pipes being so arranged that their longitudinal axes form with respect to each other an angle of preferably about 60° to 90°, and the tube piece is aligned substantially with the angle bisector of said angle.

If the portion or portions for receiving the corrugated pipe or pipes on the one hand and the tube piece on the other have substantially the same free inner diameter, a specific cable cross-section can be led through all parts of the tube connector. However, uses do occur where this full cross-section is not necessary for all the parts of the pipe connector and to save space (reduction of the outer dimensions) in such cases, in particular with restricted space conditions, to obtain optimum adaptation the portion or portions for receiving the corrugated pipe or pipes on the one hand and the tube piece on the other may then have a different free inner diameter. The pipe connector thus serves in the latter case simultaneously at least partially as reducing piece.

For most usual applications the detent members for locking the half members are configured so that after an effected locking they can be released again, either by hand or using a simple tool. This facilitates subsequent laying of additional cables or lines. However, uses do exist in which although the original laying of cables and lines is substantially facilitated by using slit corrugated pipes and the pipe connectors according to the invention, the laying once carried out is thereafter to be inaccessible at least for unauthorized persons or laymen, to prevent them getting at the lines or cables. For this purpose, advantageously the detent means for locking the half members are configured so that they provide a final locking which cannot be released again without destroying the pipe connector. An intermediate stage between these two types of configuration of the detent means would be to configure the detent means so that they can be opened only with a particularly complicated or difficultly reproduceable tool; in the latter case, it can be achieved that only particularly authorized persons in possession of such a tool can release the locking again and obtain access to the lines or cables surrounded by the pipe connector.

Whereas the pipe connectors according to the invention securely surround the corrugated pipe, moisture, dirt and the like can still penetrate into the interior in the axial direction at the end of the corrugated pipe or pipe connector and thus impair the proper function of the cables or lines laid therein. To counter such impairments, the interior of the portion for receiving the corrugated pipe comprises a means for holding a sealing membrane. To enable the latter to be pushed onto already laid cables or lines it is advantageously adapted to snap onto said lines. In corresponding manner the interior of the tube piece is preferably provided with a means for holding a corresponding sealing membrane or diaphragm. In both cases the sealing membrane is advantageously made substantially annular and the means for holding the sealing membrane is an annular recess in the interior of the portion for receiving the corrugated pipe or tube piece. As a result, the membrane is held in simple and reliable manner and can be simply pushed and snapped into the respective part of the pipe connector.

As already mentioned at the beginning, U.S. Pat. No. 3,711,633 for example discloses a pipe connector or coupler which is formed as T-piece and which is snapped onto a continuous corrugated pipe and permits the connection of a further laterally branching corrugated pipe. However, with the known T-piece only connections to corrugated pipes of the same nominal width can be established. To obtain the greatest possible flexibility of a protective pipe system of corrugated pipes with associated pipe connectors or couplers, in accordance with the present invention a pipe connector is proposed which is adapted to be folded open in the axial direction, comprises two half members connected via a film hinge which are provided with detent means for mutual locking of the half members, and comprises at least one portion which is adapted to receive a corrugated pipe and the interior of which is formed corresponding to the outer periphery of the corrugated pipe, the pipe connector comprising at least one second portion adapted to receive a second corrugated pipe, in which the inner diameter of the interiors of the first portion for receiving the first corrugated pipe and the second portion for receiving the second corrugated pipe are different from each other. Due to the fact that the inner diameters of the interiors of the first portion for receiving the first corrugated pipe and of the second portion for receiving the second corrugated pipe are different to each other, a so-called reducing piece can be obtained in simple manner.

To obtain a protective pipe system which is flexible as a whole as regards the securing parts as well, in accordance with the present invention a divisible nut of plastic is further provided for pipe connectors and said nut which is adapted to be folded open in the axial direction, comprises two half members connected via a film hinge which are provided with detent means for mutual locking of the half members and comprises an inner thread which is adapted to the outer periphery of the pipe connector, in which at least a portion of the nut is provided with an outer contour, a cap nut is provided which comprises an inner contour adapted to the outer contour of the nut and the cap nut is formed as ring provided with an interruption portion. After the actual divisible nut has been snapped or locked together, the cap nut is snapped with its inner contour onto the outer contour of the nut; this gives a particularly reliable and firm holding of the two half members of the divisible nut. Preferably, the cap nut is made integrally with the nut, this both making the production easier and cheaper and in particular facilitating assembly because no losable parts exist. Preferably, for this purpose the cap nut is connected via a simple separable connecting piece to the nut.

BRIEF DESCRIPTION OF THE DRAWINGS

The invention will be explained hereinafter in detail with the aid of examples of embodiment illustrated in the drawings, from which further advantages and features will be apparent. In the drawings.

DESCRIPTION OF THE PREFERRED EMBODIMENTS

Figure 1:
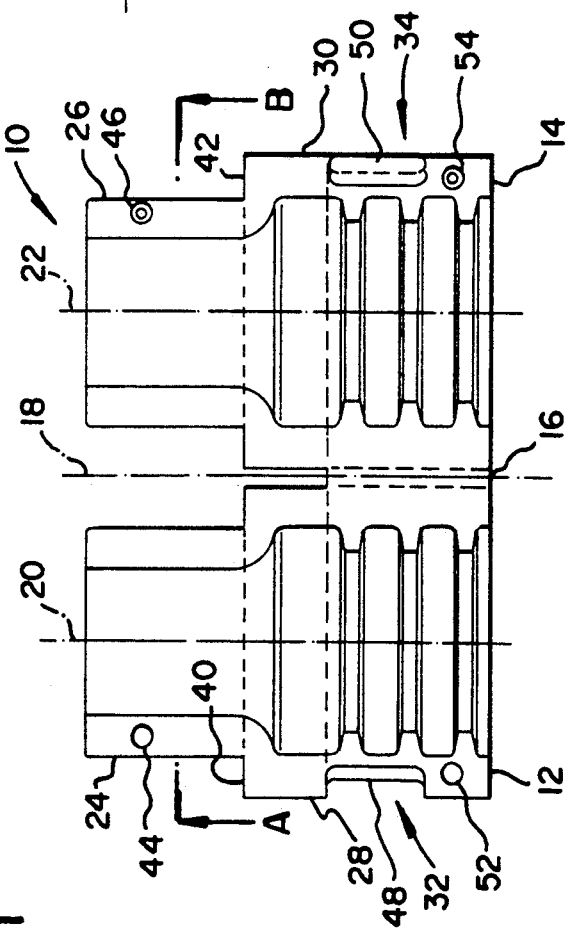
FIG. 1 is a plan view of a pipe connector according to the invention in the opened state.

In FIG. 1 a pipe connector according to the present invention is denoted as a whole by the reference numeral 10 and comprises a first half member 12 and a second half member 14 which are connected together via a film hinge 16. The (left) half member 12 comprises a central longitudinal axis 20 and the (right) half member 14 a central longitudinal axis 22. In the folded-together state of the pipe connector 10, i.e. when the two half members 12, 14 lie on each other, the two longitudinal axes 20, 22 come into coincidence.

Apart from the detent means still to be described, the two half members 12, 14 are made symmetrical. A tube piece 24, 26 consists of two tube piece portions 24 and 26 respectively. The latter are adjoined correspondingly by a portion 28 of a stop member or a portion 30 of the other stop member. The reference numerals 40, 42 denote the associated stop faces of the stop member 28, 30 which come into engagement with a wall of for example a housing surrounding a hole.

Figure 4:
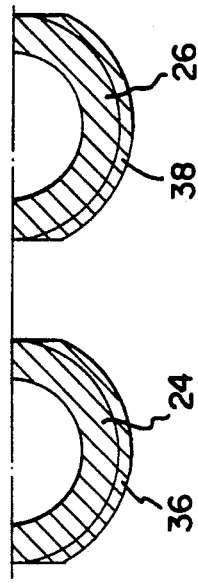
FIG. 4 is a section along the line A-B of FIG. 1.

As particularly apparent from the section A-B illustrated in FIG. 4, the tube piece 24, 26 has an outer thread 36, 38.

The reference numeral 32 denotes part of a portion for receiving a corrugated pipe and the reference numeral 34 correspondingly denotes the second part of the portion for receiving a corrugated pipe.

In the left half member 12 two detent holes 44, 52 and a detent recess 48 are provided and, corresponding thereto, in the right half member 14 two detent pins 46, 54 and a detent nose 50 respectively. In the locked state of the pipe connector 10 the detent pin 46 is engaged in the detent hole 44, the detent pin 54 in the detent hole 52 and the detent nose 50 locked in the detent recess 48.

Figure 3:
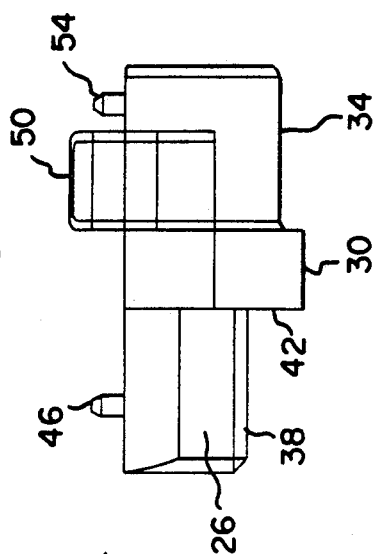
FIG. 3 is a side elevation of the pipe connector according to FIGS. 1 and 2.
Figure 2:
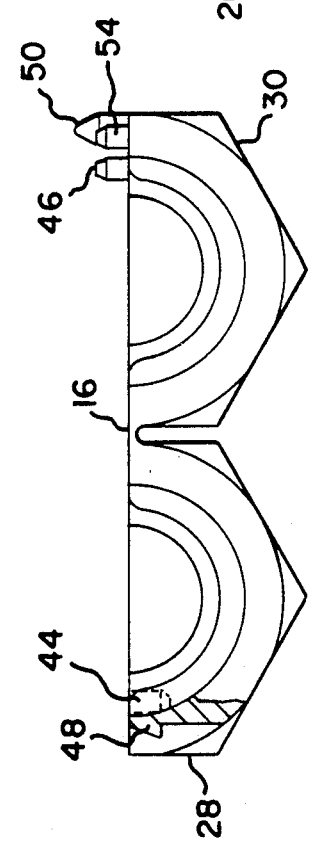
FIG. 2 is a partial front elevation of the pipe connector shown in FIG. 1.

The mutual association and function of the detent means will become particularly clearly apparent from a comparison of FIGS. 1-3.

Figure 5:
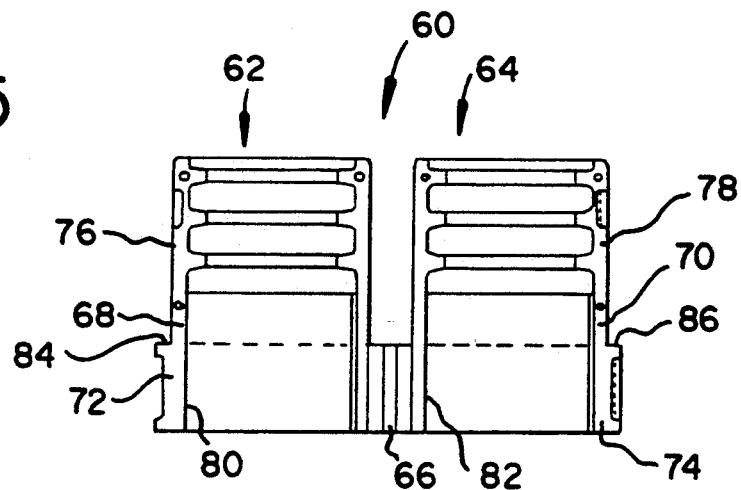
FIG. 5 is a plan view of a further example of embodiment of a pipe connector according to the invention in the opened state.

FIG. 5 shows a further embodiment of a pipe connector according to the invention which is denoted as a whole by the reference numeral 60. A (left) half member 62 and a (right) half member 64 are connected together via a film hinge 66. In this embodiment the portion 76, 78 formed to receive a corrugated pipe is followed by a tube piece which consists of two tube piece parts 68, 70 and with which a stop member 72, 74 is integrally formed. The tube piece 68, 70 is provided with an inner thread 80, 82.

The stop face of the stop member 72, 74 is denoted by the reference numerals 84, 86. The outer periphery of the stop member 72, 74 is formed as hexagon so that an open-jawed wrench or spanner of corresponding width can be placed thereon.

Figure 6:
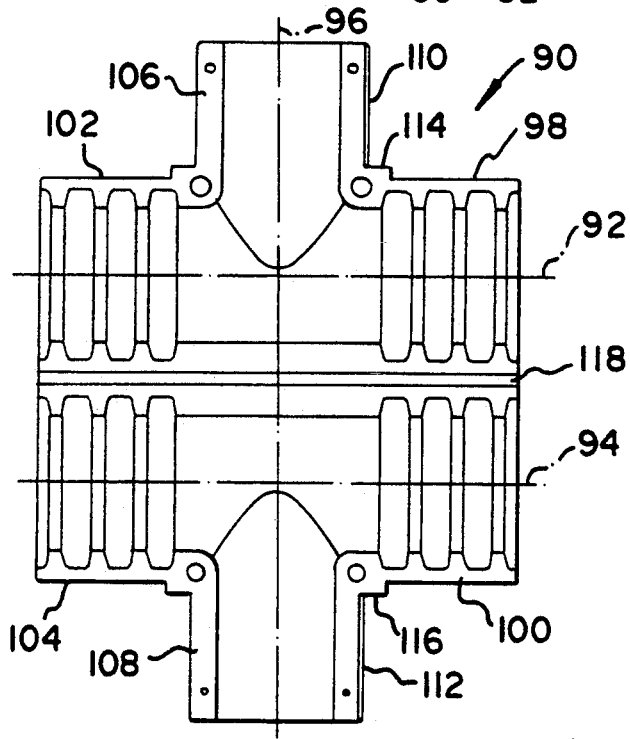
FIG. 6 is a plan view of a further example of embodiment of a pipe connector according to the present invention constructed as T-piece.

FIG. 6 illustrates a further example of embodiment of a tube connector according to the present invention, denoted as a whole by the reference numeral 90. The pipe connector 90 is also formed as so-called T-piece. In the locked together or snapped together state of the T-piece 90 the two longitudinal axes 92, 94 of portions for receiving corrugated pipes coincide and a transverse axis 96, the longitudinal axis of an externally threaded tube piece, extends transversely thereof at an angle of 90°.

The one portion for receiving a corrugated pipe is denoted by the reference numerals 98, 100 and the other portion for receiving a corrugated pipe by the reference numerals 102, 104. Of course, it is also possible to receive a continuous corrugated pipe between the portions 98, 102 on the one hand and 100, 104 on the other hand.

The tube piece in this embodiment consists of tube piece parts 104, 108 which are provided with an external thread 110, 112. The stop member in this embodiment is indicated by the stop faces 114, 116.

In the embodiments described above the free inner diameter of the portion for receiving the corrugated pipe or the portions for receiving the corrugated pipes and the free interior of the tube piece are provided with substantially the same diameter. In contrast, in the embodiment of a pipe connector according to the present invention illustrated in FIG. 7 the corresponding inner diameters differ so that a so-called reducing piece is obtained.

Figure 7:
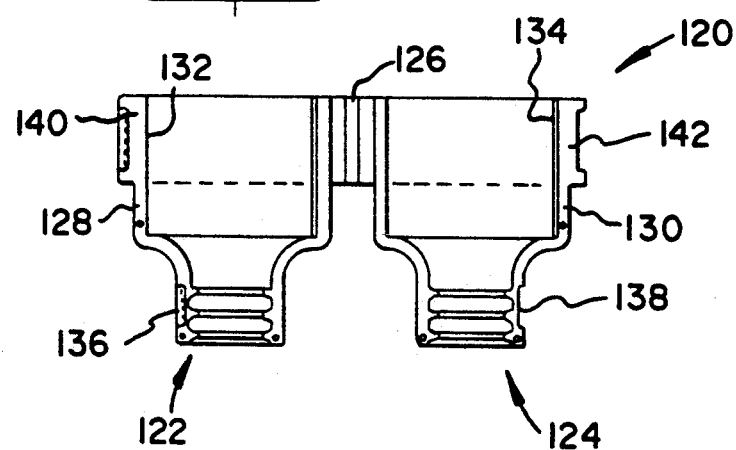
FIG. 7 is a plan view of a further pipe connector constructed as reducing piece in accordance with the present invention in the opened state.

The reducing piece 120 illustrated in FIG. 7 comprises a (left) half member 122 and a (right) half member 124 which are integrally joined together via a film hinge 126. The reference numerals 128, 130 denote a tube piece portion comprising an inner thread 132, 134. In the end portion of the tube piece portion 128, 130 a stop member 140, 142 is formed, the outer contour of which is configured as hexagon so that an open-jawed spanner can be placed thereon.

The tube piece portion 128, 130 gradually tapers and merges into a portion 136, 138 for receiving a corrugated pipe. Compared with the free inner diameter of the tube piece portion 128, 130 the free inner diameter of the portion 136, 138 is reduced in diameter to receive a corrugated pipe; the reducing piece 120 thus serves to connect a corrugated pipe of reduced diameter compared with the other pipe connectors.

Joint consideration of FIGS. 5 to 7 will illustrate the module-like system versatility of the tube connectors according to the present invention. Thus, for instance, the pipe connector 60 illustrated in FIG. 5 can be screwed onto the tube piece 106. 108 of the T-piece 90 shown in FIG. 6 if the free inner diameter is to remain the same. If however, the free inner diameter is to be reduced so that less space is required, and for instance because from the tube piece 106, 108 only part of the cables or lines leading along the axes 94, 92 are to be branched off, the reducing piece 120 illustrated in FIG. 6 is screwed onto the tube piece 106, 108.

It is of course for example likewise possible to modify the reducing piece illustrated in FIG. 7 so that the free inner diameter of the portion for receiving a corrugated pipe is larger than the free inner diameter of the tube piece.

Figure 8:
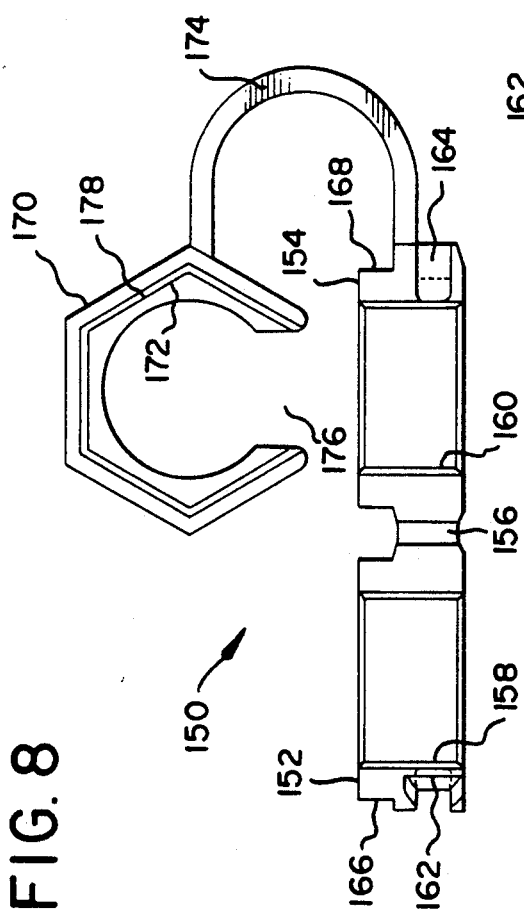
FIG. 8 is a plan view of a divisible nut according to the present invention with associated cap nut.
Figure 9:
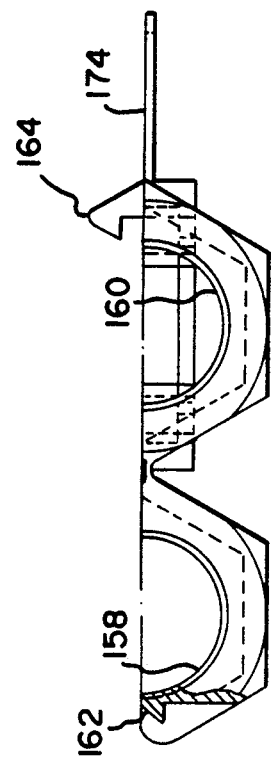
FIG. 9 is a partial front elevation of the divisible nut illustrated in FIG. 8
Figure 10:
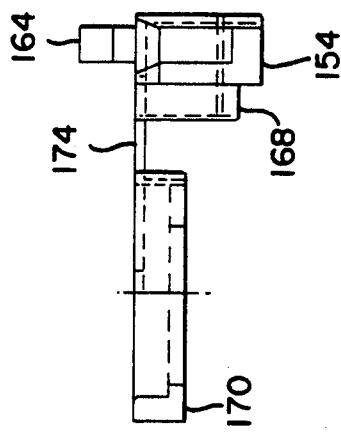
FIG. 10 is a side elevation of the divisible nut illustrated in FIGS. 8 and 9.

In FIGS. 8-10 a divisible nut of plastic according to the present invention is illustrated and denoted as a whole by the reference numeral 150. The divisible nut 150 comprises two half members 152, 154 which are connected together via a film hinge 156. Each of the half members 152, 154 comprises an inner thread 158 and 160 respectively.

On the (left in FIG. 8) half member 152 a detent recess 162 is provided and on the (right) half member 154 a corresponding detent nose 164 is formed to match the detent recess 162. When the two half members 152, 154 are pushed together to form the closed nut 150, by mutual locking of the detent nose 164 to the detent recess 162 mutual locking of the half members 152 and 154 is achieved.

A certain weakpoint here is however the relatively thin film hinge 156. The latter must of course be flexible enough to enable the two half members 152, 154 of the nut 150 to come into engagement with each other. Particularly under high actuating forces, i.e. on strong tightening of the nut 150, the film hinge 156 is highly stressed and when this stress becomes excessive this can lead to the film hinge 156 stretching and a secure fit of the nut 150 for instance on the outer thread of a tube piece of a pipe connector is then no longer ensured, or to said hinge even tearing, the nut 150 then becoming useless. According to the present invention a cap nut 170 is used to overcome these difficulties.

The two half members 152, 154 each comprise a somewhat tapered portion which is provided with a specific outer contour 166 and 168 respectively. For example, the outer contour 166 of the half member 152 may include three sides of a hexagon and the other outer contour 168 of the other half member 154 likewise three (other) sides of a hexagon so that the tape portion in the closed state of the nut 150 has the outer contour 166, 168 of a hexagon. A corresponding inner contour 172 of the cap nut 170 is adapted thereto. However, this inner contour is not closed, in order to ensure that the cap nut 170 can be pushed for example over already laid lines and the cap nut 170 is therefore configured as open ring having an interruption portion 176.

Now, if the divisible nut 150 is to be screwed for instance onto the outer thread of a tube piece of a pipe connector according to the invention, the cap nut 170 is first pushed or clipped on. The cap nut 170 thus serves as washer between a wall out of which a tube piece extends through a hole and the nut 150. The nut 150 is then closed and screwed onto the tube piece until it comes into loose engagement with the cap nut 170. The inner contour 172 of the cap nut 170 is provided with a chamfer so that on further tightening of the nut 150 the outer contour 166, 168, running onto the chamfer 178, turns into the inner contour 172 of the cap nut 170. In this manner the nut 150 is prevented by the cap nut 170 from widening, for example by lengthening of the film hinge 156.

Consequently, with the nut 150 according to the invention considerably higher tightening torques can be achieved than with a divisible nut not having a cap nut 170.

Figure 11:
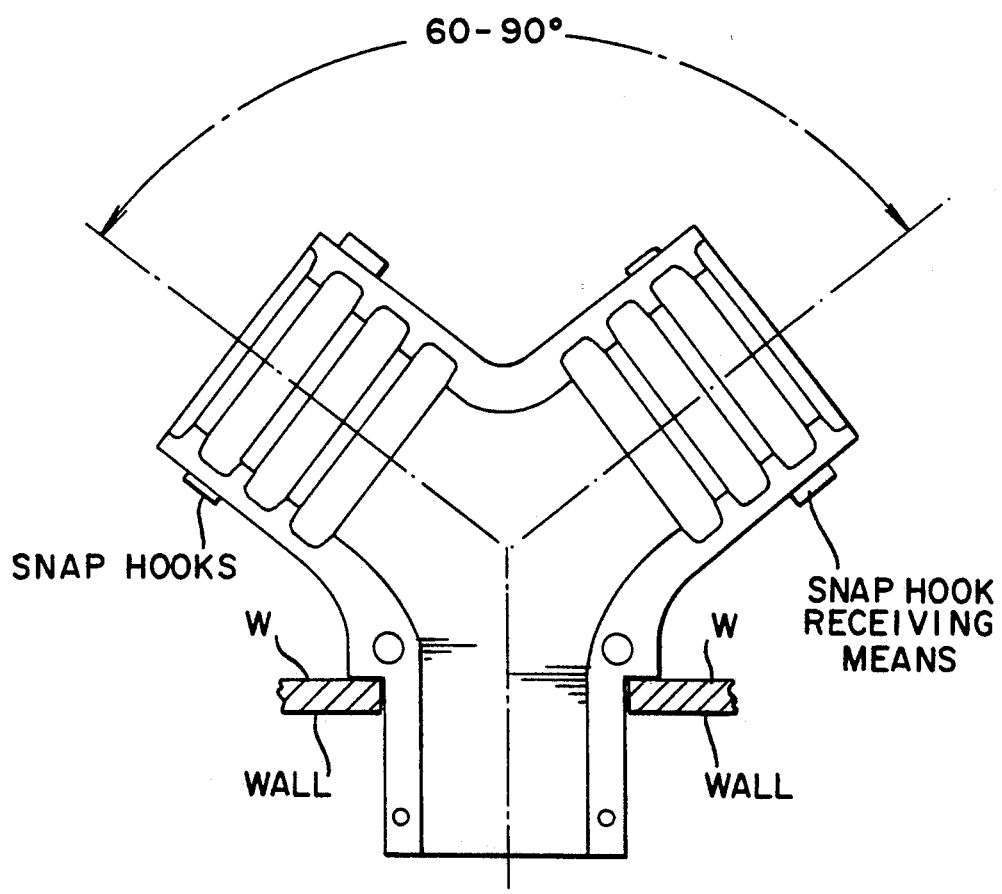
FIG. 11 is a plan view of a pipe connector which is Y-shaped.

A connecting piece 174 connects the nut 150 to the cap nut 170. In this manner, any possibility of the cap nut 170 being lost is eliminated and by the presence of the cap nut 170 the attention of a fitter can always be drawn to the fact that said nut 170 should be used. The nut 150, the connecting piece 174 and the cap nut 170 can be made integrally in one working operation, thus also facilitating production and reducing the cost thereof. Preferably, the connecting piece 174 is so constructed that if necessary it can easily be severed; for this purpose, for instance thinner portions may be provided on the connecting piece 174 in the vicinity of the half member 154 and/or of the cap nut 170. This makes it possible to achieve that, possibly even without using a tool, the connecting piece 174 can be severed should it be an obstruction in the laid state of the nut 150. FIG. 11 is a plan view of a pipe connector which is Y-shaped. That is, in FIG. 11, the pipe connector has two longitudinal axes which define an angle to each other of preferably about 60° to about 90°, and the tube piece is aligned substantially with the angle bisector so that the pipe connector is made Y-shaped. A cross section of a wall W having a hole therein is shown, in which the tube piece is shown disposed.

We claim:

1. A pipe connector composed of plastic for connection to a corrugated pipe, comprising:
   a first pipe connector half having a first contact surface and a second pipe connector half having a second contact surface;
   said first pipe connector half having a first receiving portion for receiving a portion of a corrugated pipe in mating engagement therewith, and said second pipe connector half having a second receiving portion for receiving another portion of a corrugated pipe in mating engagement therewith;
   said first pipe connector half having a first stop surface and a first cylindrical threaded end portion extending from said first stop surface, and said second pipe connector half having a second stop surface and a second cylindrical threaded end portion extending from said second stop surface, said first and second stop surfaces being adapted for engagement with a wall surrounding a hole which receives said first pipe connector half and said second pipe connector half;
   said first and second pipe connectors having an assembled condition in which said first and second cylindrical threaded end portions together form a threaded cylindrical pipe connector end extending from a pipe connector stop surface formed by said first and second stop surfaces, said threaded cylindrical pipe connector end having a predetermined outer diameter, and said pipe connector stop surface having an outermost diameter which is greater than said predetermined outer diameter of said threaded cylindrical pipe connector; and
   a flexible film hinge connecting a first end of said first pipe connector half to a first end of said second pipe connector half such that said first contact surface of said first pipe connector half can be brought into contact with said second contact surface of said second pipe connector half; and
   detent means for selectively connecting a second end of said first pipe connector half to a second end of said second pipe connector half when said first contact surface of said first pipe connector half is in contact with said second contact surface of said second pipe connector half.

2. A pipe connector according to claim 1, wherein the pipe connector is made in one piece.

3. A pipe connector according to claim 1, wherein the pipe connector has at its outer periphery a non-smooth surface which constitutes a fluting.

4. A pipe connector according to claim 1, wherein the pipe connector is configured at its outer periphery for placing of a tool.

5. A pipe connector according to claim 4, wherein the pipe connector is made hexagonal at its outer periphery for placing of an open-end wrench.

6. A pipe connector according to claim 1, wherein the threaded cylindrical pipe connector end is provided with an outer thread.

7. A pipe connector according to claim 1, wherein the threaded cylindrical pipe connector end is provided with an inner thread.

8. A pipe connector according to claim 1, wherein the portion for receiving the corrugated tube, the first and second stop surfaces, and the threaded cylindrical pipe connector end are arranged in series in an axial direction of the pipe connector.

9. A pipe connector according to claim 1, wherein two portions are provided for receiving a respective corrugated pipe.

10. A pipe connector according to claim 9, wherein the two portions are arranged in alignment with each other along an alignment axis, and wherein a longitudinal axis of the threaded cylindrical pipe connector end extends transversely of said alignment axis so that the pipe connector is T-shaped.

11. A pipe connector according to claim 9, wherein the two portions are so arranged that their longitudinal axes define an angle to each other of preferably about 60° to about 90° in alignment with each other along an alignment axis, and wherein a longitudinal axis of the threaded cylindrical pipe connector end is aligned substantially with a direction of a bisector of said angle, so that the pipe connector is Y-shaped.

12. A pipe connector according to claim 1, wherein the portion or portions for receiving the corrugated pipe or corrugated pipes and the tube piece have substantially the same inner diameter.

13. A pipe connector according to claim 1, wherein the portion or portions for receiving the corrugated pipe or corrugated pipes and the tube piece have a different inner diameter.

14. A pipe connector according to claim 1, wherein the detent means for locking the half members are formed for release of the locking after said locking has been effected.

15. A pipe connector according to claim 1, wherein the detent means are formed for locking the half members for final locking thereof.

16. A pipe connector according to claim 1, wherein the interior of the portion for receiving the corrugated pipe has a means for holding a sealing membrane.

17. A pipe connector according to claim 1, wherein the interior of the threaded cylindrical pipe connector end has a means for holding a sealing membrane.

18. A pipe connector according to claim 16, wherein the means for holding a sealing membrane is an annular recess, and wherein an annular sealing membrane is held in said annular recess.

19. A divisible nut of plastic for pipe connectors, which is adapted to be folded open in the axial direction, comprising:
   two half members connected via a film hinge;
   said two half members having detent means for mutual locking thereof;
   an inner thread;
   said inner thread is formed to the outer periphery of the pipe connector;
   wherein at least a portion of the nut is provided with an outer contour, and further comprising a cap nut which comprises an inner contour adapted to the outer contour of the nut, and wherein said cap nut is formed as a ring having an interruption portion.

20. A nut according to claim 19, wherein the cap nut is made integral with the nut.

21. A pipe connector according to claim 20, wherein the cap nut is connected to the nut via a singularly separable connecting piece.

22. A pipe connector according to claim 1, wherein the pipe connector has at its outer periphery a non-smooth surface.

23. A pipe connector according to claim 20, wherein the cap nut is connected to the nut by a connecting piece.

* * * * *